United States Patent [19]

Bergeret et al.

[11] Patent Number: 4,852,138
[45] Date of Patent: Jul. 25, 1989

[54] IRRADIATION CELL CONVEYOR SYSTEM

[75] Inventors: Marcel Bergeret; Daniel Pellerin, both of Lyon; Vincent Rochette; André Rubert, both of Villeurbanne, all of, France

[73] Assignee: Conservatome, Montluel, France

[21] Appl. No.: 27,949

[22] Filed: Mar. 19, 1987

[30] Foreign Application Priority Data

Mar. 20, 1986 [FR] France .................. 86/04316

[51] Int. Cl.⁴ .............................................. G01T 7/08
[52] U.S. Cl. ...................................... 378/69; 378/68; 250/453.1
[58] Field of Search .................... 378/68, 69, 64; 250/492.1, 492.3, 453.1, 454.1, 455.1

[56] References Cited

U.S. PATENT DOCUMENTS 3,564,241  2/1971  Ludwig ............................... 378/69
3,641,342  2/1972  Armel et al. ........................ 378/69
4,013,261  3/1977  Stiegerwald et al. ............ 250/453.1

FOREIGN PATENT DOCUMENTS 934217  8/1963  United Kingdom ............. 250/453.1

Primary Examiner—Carolyn E. Fields
Assistant Examiner—Joseph A. Hynds
Attorney, Agent, or Firm—Dennison, Meserole, Pollack & Scheiner

[57] ABSTRACT

A conveyor is provided for use in an irradiation cell to transport goods to be irradiated past a radiation source panel. The conveyor has a plurality of irradiation conveyor lines parallel to the source panel, which "parallel" lines are independent of each other. Transfer conveyor lines, perpendicular to the alignment of the "parallel" conveyor lines and the source panel, and located outwardly of the ends of the source panels and crossing the extended paths of the irradiation conveyor lines, are provided for transferring goods to be irradiated to the parallel conveyor lines and for permitting direct exposure of two sides of goods to the same panel.

13 Claims, 3 Drawing Sheets

IRRADIATION CELL CONVEYOR SYSTEM

TECHNICAL SPHERE

The invention concerns a polyvalent industrial device for gamma irradiation, particularly with use of cobalt 60 sources. This device provides simultaneous irradiation of a plurality of similar different products, particularly packages which are still loaded on their original handling palette.

STATE OF THE ART

A great variety of product can be subjected to gamma irradiation : food products or materials, chemical products, particularly polymers, or metallurgical products, packagings, articles or materials for use in hospitals, or medications or pharmaceuticals, etc... for different purposes : sterilization, destruction of microorganisms, modification of chemical or surfactant properties, catalysis, activation... In each of these cases, the body which is subjected to irradiation must by the end of the treatment have received a dose of between a certain minimum and a certain maximum which will provide the effect which is sought while not harming the body. This min. dose/max. dose ratio expressed in gray (or in rads) is determined for each body as a function of the purpose of the treatment. The dosage absorbed depends upon the thickness and density of the body, the duration of exposure, and also upon its distance from the source and the presence of a screen separating it from the source, etc. The nature of the source (cobalt, cesium . . . ), its size, its power or intensity, its age, its form, etc. are also significant.

The subject is irradiated within an enclosure which forms a biological protection screen, hereinafter called the cell. This shelters the gamma source(s) which radiate in the entire enclosure and is/are present in the form of a plurality of rods containing the active material, generally either shaped into a cylinder, or in one or more parallel panels. The products to be processed pass before the source(s), for example on each side of the panel or even between the panels, in one or more passages, at the same or at different levels and with different orientations to the panel(s).

The products are conveyed from outside the cell into the cell through a labyrinth and they are passed before the source(s) on a device called a conveyor. The conveyors must be equipped so that they can accept parcels of various types of products which vary in density and in processing requirements. Floor or suspended conveyors transport the loads to be irradiated placed at 2 or 3 levels on movable platforms or dollies. The horizontal thickness of the load is not generally greater than 60 cm, to assure homogeneity of exposure, and the conveyor can provide one or more passes into the cell, and the products are changed in stages with each pass.

The loading and unloading of these small containers raise the cost of handling when the material to be irradiated is itself of only low cost. An arrangement accepting only small packages is then not suitable for economic processing of thick loads. Then loads of greater thickness must be treated in assembled batches which need not be burst open to be loaded on the conveyors.

The conveyor cycle inside the cell is continuous and is such that the loads being brought in make two or three passes parallel to the source panel, coming close to each panel, and then pass to the other side of the panel, or between the two panels, before passing to the other side of the second panel, and then make two or three passes again parallel to this second side, but this time at a greater distance from each of them. They exit the cell through the labyrinth. In some embodiments, the loads can change level after each pass past the source. This continuous movement allows successive presentation of the two sides of the movable platform or dolly to the radiation.

Figure 1:
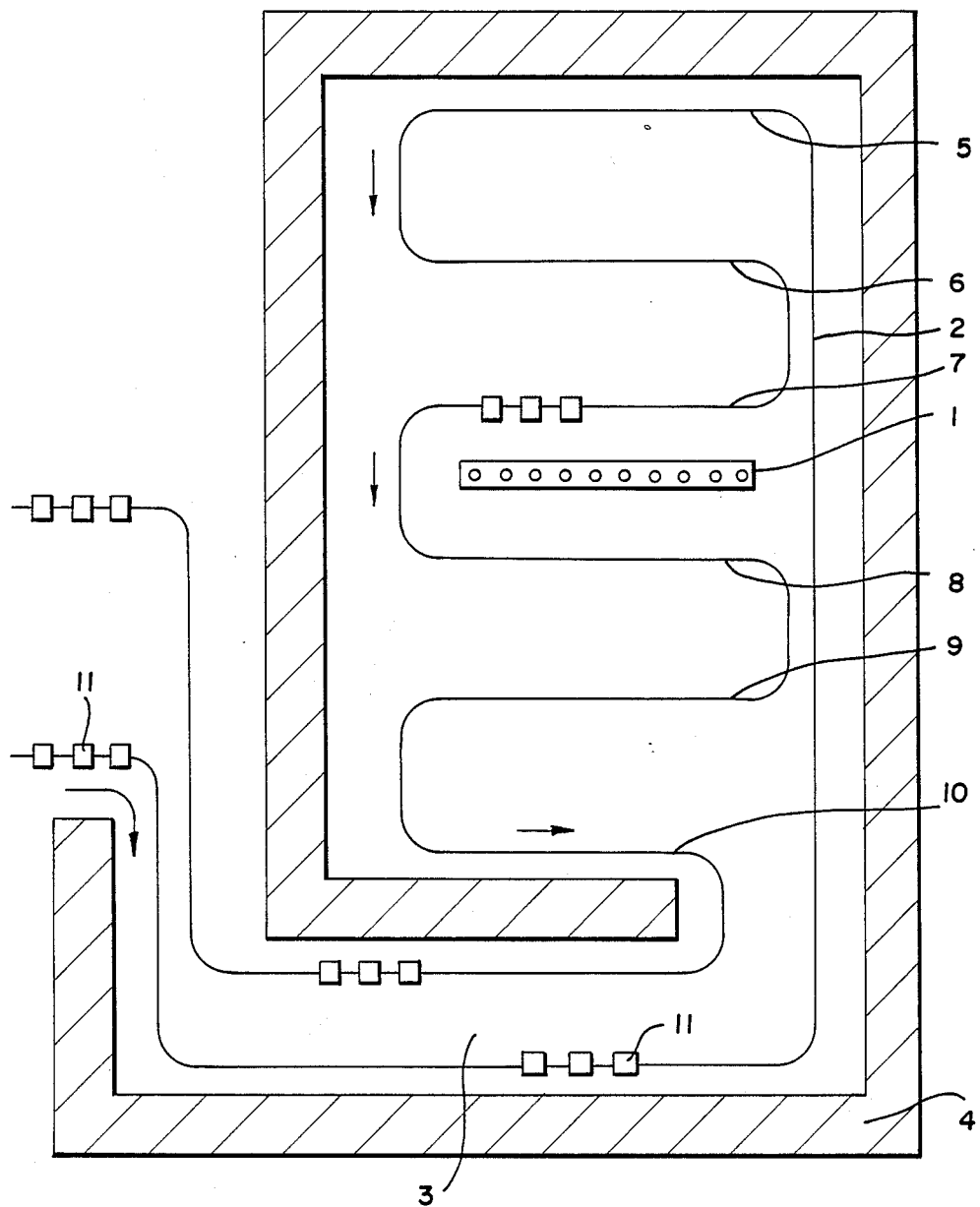
FIG. 1 is a planar diagram of one exemplary embodiment of the cell of prior art. It contains one single source (1) in the form of a flat panel; the conveyor (2) introduces the loads (11) through a labyrinth (3) into the cell which is defined by the enclosure (4) and passes for examples three times (5, 6, 7 and then 8. 9, 10) before each side of the source before being discharged.

With a device of this type, it is obvious that a predetermined load passes systematically from one slightly exposed area (5), for example, at some distance from the source and protected by the screen formed by the rows (6) and (7), to a very exposed area (7) in direct contact with the source and vice versa.

Thus, if the containers of the conveyor are to be loaded with products which are different in density and/or necessary doses, it is obvious that it will be very difficult to regulate the doses received while still respecting the limits of the min. dose/max. dose ratios; also, the doses which are received can be greatly dispersed, if the speed at which they pass by is the same for all of the products and the effects of the screens vary because of the diversity of products.

The device is better adapted and more easily exploitable in the case of loads of identical products, on condition that it can on demand vary the speed of passage and/or the intensity of radiation by changing the composition of the source.

To avoid the loading and unloading of products to and from movable platforms or dolliess, it is possible to consider processing them directly on their original palette, which is usually used for their delivery and/or handling. Such a load unit then presents a horizontal thickness on the order of one meter, which then requires successive irradiation on several sides so that the product situated at the center of the palette also receives its proper dose.

The irradiation of the palettes may be carried out in a known manner, by using a cylindrical source around which the palettes are circulated on a conveyor by use of a carrousel unit comprising separate devices to assure the rotation of the palettes, so that all sides of the palettes are irradiated, and to assure their position in height relative to the source. Such a unit presents the drawback of being complex and not very productive, and not using the source continuously to good advantage; in fact, on the one hand, screens must be placed at the corners of the palettes, which are very exposed areas, to avoid overdoses, and on the other hand, because of the mechanical complexity, only a small total quantity of products can surround the source.

The object of the invention is to treat a plurality of products of any dimensions, but preferably products placed on palettes or some other standard packaging (crates, palettes, containers, cans...) or other objects of large dimensions which cannot be broken down which are designated hereinafter as large parcels, by solving the problems due to the horizontal thicknesses of the individual loads at the same time as their diversity (density, ratio of acceptable min./max. doses, while still improving the efficiency of use of the radiation from the source.

Another object is to improve the effectiveness of treatment of parcels of any dimensions, but preferably large parcels.

Another object is to simultaneously process products which are either identical or different in densities and/or in necessary doses and/or acceptable min./max. dose ratios. In the case of different batches, it is also to increase the flexibility of operation and to facilitate the technical management of the treatment.

Another object is to increase the similarity of the doses received by the products, in other words to lower the difference between the min./max. doses which are actually received.

Another object is to increase the effectiveness of use of the source without use of an absorbent screen.

DESCRIPTION OF THE INVENTION

The invention is a simple device intended to use gamma radiation to simultaneously irradiate an entire load constituted of a plurality of parcels of products of all dimensions, large or small, broken down into sections or not, delivered in small parcels or boxes, or in large packages such as palettes, crates, containers, cans or the like . . . in order to avoid handling or breaking down of the loads as much as possible, to treat the similar or different loads by facilitating the technical management of the process, in other words the control of the dose received by each of the parcels, and also to increase the similarity of irradiation and the useful effectiveness of the source.

It comprises joining conveyors equipped with movable platforms, which introduce and remove the parcels loaded on one or more levels (generally 3) into and from the cell through a labyrinth, said cell containing the radiation sources assembled in the form of one or more parallel panels.

It is characterized in that the conveyor device is placed inside the cell, when it comprises one single source panel, as in :

(a) a plurality of lines intended for the irradiation processing, independent from each other, parallel, located on either side of the source panel, and longer than the source panel, preferably three on each side.

(b) two transfer lines for the parcels, perpendicular to the alignment of the source panel, located on each side of this wall at the level of the lines described under a), which feed and remove the products to be processed to and from said lines a) individually, which operate in both directions and which are in turn fed and evacuated respectively by the feed or evacuation lines of the joining conveyors communicating with the outside through the labyrinth.

When the cell comprises two or more parallel source panels, then in addition to the elements already described, the conveyor can also have one or more independent lines of irradiation between and parallel to the source panels.

Figure 2:
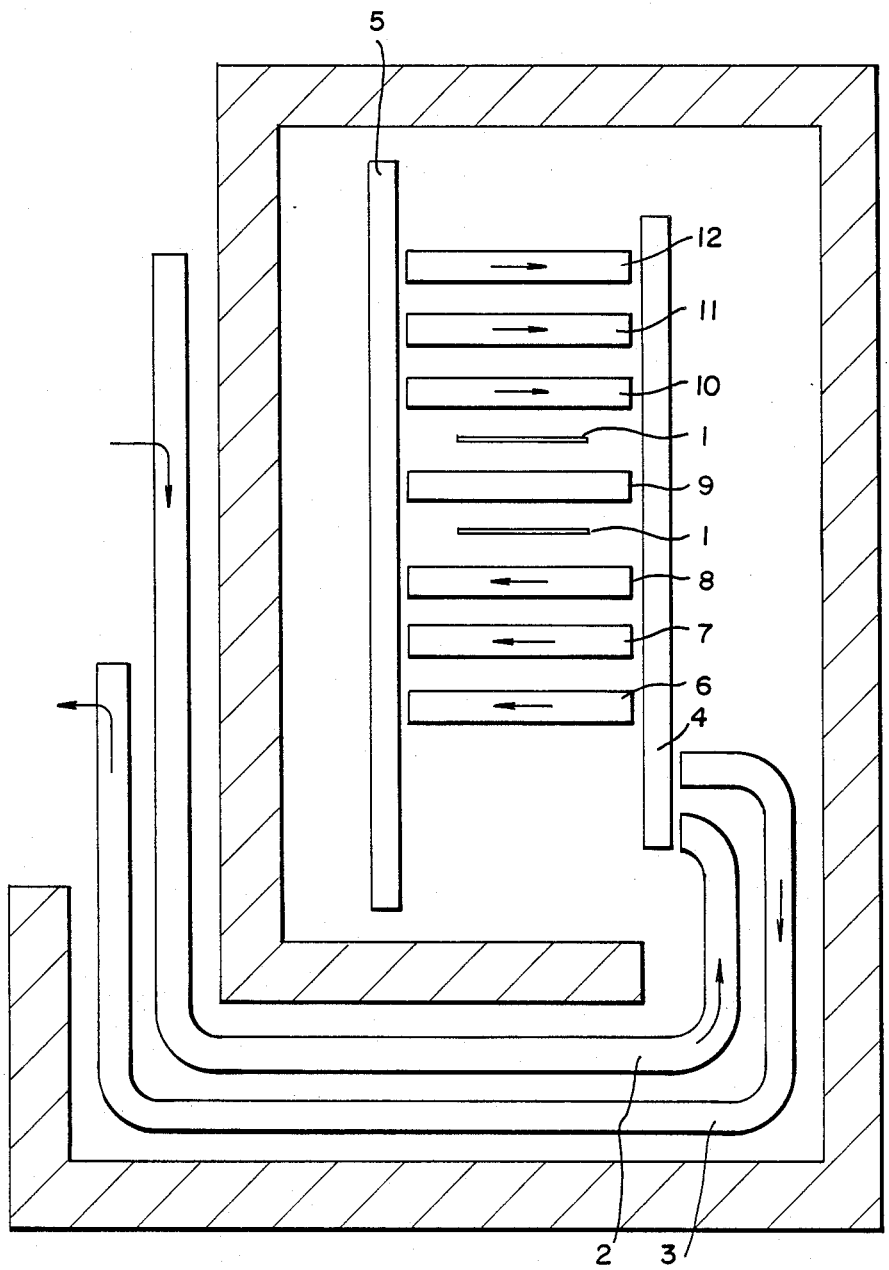
FIG. 2 shows an exemplary embodiment of an irradiation cell incorporating a conveyor system in accordance with the present invention.
Figure 3:
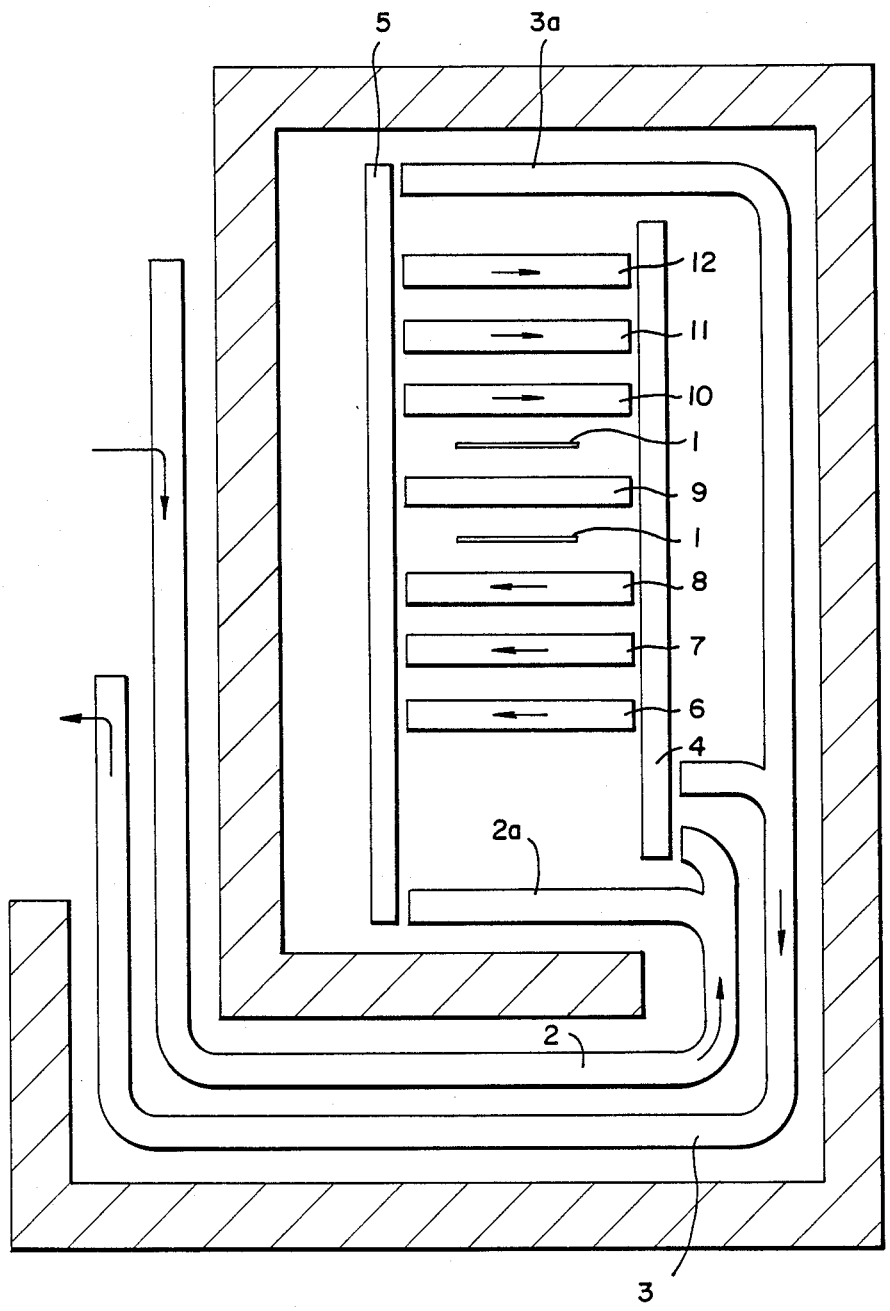
FIG. 3 shows another embodiment of an irradiation cell incorporating a conveyor system in accordance with the present invention wherein conveyor lines communicating with the outside of the irradiation cell are modified.

The devices of FIGS. 2 and 3 show two particular nonlimiting applications. The cell specifically comprises two sources panels (1). Parcels are fed into the cell on a joining conveyor (2), and are evacuated by the joining conveyor (3). These two conveyors end in FIG. 2 in one single transfer conveyor (4); but they could also all validly end in the other transfer conveyor (5), or, by the switching and shunting assembly, they could end at both of them (solutions 2a and 3a), or even conveyor (2) alone could end on transfer conveyor 4 and/or 2 on 5, or vice versa. Among the branch lines of conveyors (6) to (12) which are intended for processing, one single one (9) is found between the two sources, but several of them could be there.

The conveyors can be suspended in the air or installed in the ground, and they can move at constant speed; on the other hand, it is advantageous to improve the efficiency of the source, and the effectiveness, and to fully profit from the advantages of the device according to the invention, to have variable speed and direction of the conveyors for processing or for transfer.

One improvement of the device resides in being able to regulate the distance separating each treatment line individually from the source panel(s). The control can be automatic or manual.

Although the device according to the invention can be used as described above, to irradiate a great variety of products of any dimensions, it is preferably used to process large packages and particularly those loaded on palettes. To transport them, the conveyor can move the individual devices, which are similar to racks or movable platforms, which are not described, in which one or more palettes are placed at various levels, generally 3 levels, and the entirety forms a parcel.

The movable platforms are passed from one conveyor branch line to another by any known device, such as jack, switching mechanism, transfer carts . . . , which are not described here.

The devices to change the level of the palettes are not described. For optimum use of the device according to the invention, thus assuring security of the operation and lower cost, and particularly for transfers, changes of levels and other remote handling of the parcels, it is advantageous to provide remote control of said movements by microprocessors and computers. If they are needed, absorber screen can be placed between the source(s) and the products to be irradiated, but, generally speaking, the products situated on the intermediate treatment lines, e.g. (8) and (10), play the role of a screen for the others, which heightens the improvement of the efficiency of the source and its flexibility of use.

OPERATION

The conveyors for the processing are used separately from each other. These lines can be operated :

in continuous file, in other words a parcel will use all of the lines in succession.

in parallel file, in other words the same products or different products are circulated simultaneously on each of the lines being used which are parallel to each other.

in double-purpose file, wherein some lines can serve for continuous passage, and others are used in parallel passage.

Lines 8 and 10 are mainly reserved for the products receiving high doses; if they are absorbent, it is then possible to treat the products requiring higher doses than in the above case on lines (7)–(11) and (6)–(12). It is possible to provide only 8% of the initial radiation on lines (7)–(11), and only 1% on lines (6)–(12).

The variable speeds of the conveyors also allow adjustment of the lengths of exposure and therefore of the doses received while simultaneously taking into account the screen effects due to the products present on the intermediate lines.

In FIG. 2, the movable platforms on conveyor (2) pass one by one onto transfer conveyor (4) which has received the order to carry each of them toward the processing line which it must take, which is determined by its constitution, the dose which it is to receive, and optionally by the absorption of the products which serve as screens located on the line or lines between the source panel and the selected line.

Generally speaking, the movable platform begins by passing onto one of the lines (6), (7) or (8), and then, to irradiate its other side, it passes onto the transfer line (5) which carries it onto the processing line (10), (11) or (12), symmetrical with the preceding. It then passes onto transfer conveyor (4) which carries it onto evacuation conveyor (3). It is also possible to cause one single movable platform to pass onto several lines by passing in succession from the least exposed to the most exposed, for example successively on lines 6–12–7–1–1–8–10–9–before being evacuated. This can take place if the load being treated in the cell is homogenous. This cycle can be shortened for instance by not beginning it until line (7).

These treatment cycles are given only as illustrative examples, as a great number of other cycles can be arranged as needed, and thus the device according to the invention provides great flexibility of exploitation. In particular, because of their distance from the source, lines (6), (7), (11), (12) allow for processing of dense products which tolerate only those low doses which correspond to low min./max. dose ratios.

It is obvious that it is possible to process heterogeneous loads simultaneously, in other words, the products can be different on each of the pairs of lines (6)–(12) or (7)–(11) or (8)–(10). The load can also be similar on all of the lines in the cell.

Because of its flexibility, this device allows for processing of products of all dimensions, but preferably large products and particularly complete palettes of products; it deletes the handling steps of loading and unloading the small movable platforms or dollies which are traditionally used, and allows the irradiation of large parcels which cannot be subdivided. Because of this, the irradiation can also be applied to low-cost products.

This improved productivity is obtained by simple means requiring only elementary handling means which are easily commercially available.

Besides, the efficiency of use of the radiation from the source can be kept continuously at the highest possible efficiency by judicious use of products on the processing lines which are more or less absorbent and/or which can accept more or less high doses.

The device according to the invention also allows for processing of high density products, even if the products can withstand only very small doses (below 0.01 Mrad) with a powerful source (above $3 \times 10/6$ Curie).

We claim:

1. In an irradiation cell comprising a gamma radiation source panel in the cell to simultaneously irradiate an entire load constituted of a plurality of similar or different products of all dimensions, loaded and conveyed through the cell on movable platforms, the improvement comprising a conveyor means at least partially contained inside said irradiation cell containing one irradiation source panel and said conveyor means comprises:
   (a) a plurality of irradiation conveyor lines independent from each other, in generally parallel conveying relation to each other, and located on either side of the radiation source panel;
   (b) a plurality of transfer conveyor lines generally perpendicular to the alignment of the source panel, located on each side of the source panel and positioned adjacent to said irradiation conveyor lines for feeding and removing the products to be treated to and from said irradiation conveyor lines, said transfer conveyor lines of comprising means for receiving products to be irradiated and discharging irradiated products by conveyor lines communicating with the outside of the cell; and
   (c) said irradiation conveyor lines and transfer conveyor lines comprising means for directly subjecting to irradiation opposite sides of each product carried by said irradiation conveyor.

2. In an irradiation cell comprising a gamma radiation source panel in the cell to simultaneously irradiate an entire load constituted of a plurality of similar or different products of all dimensions, loaded and conveyed through the cell on movable platforms, the improvement comprising the cell containing two or more parallel source panels and that the conveyor device for the movable platforms comprises:
   (a) a plurality of irradiation conveyor lines independent from each other, in generally parallel conveying relation to each other and located on either side of the source panels, with one or more of the irradiation conveyor lines being located between the source panels;
   (b) a plurality of transfer conveyor lines generally perpendicular to the alignment of the source panels, located on each side of said source panels and positioned adjacent to the irradiation conveyor lines for feeding and removing products to be treated to and from said irradiation conveyor lines, said transfer conveyor lines comprising means for receiving products to be irradiated and discharging irradiated products by conveyor lines communicating with the outside of the cell; and
   (c) said irradiation conveyor lines and transfer conveyor lines comprising means for directly subjecting to irradiation opposite sides of each product carried by said irradiation conveyor lines.

3. The irradiation cell as in any one of claims 1 or 2, wherein the conveyor lines are supported from the floor of the cell.

4. The irradiation cell as in any one of claims 1 or 2, wherein the conveyor lines are suspended within the cell.

5. The irradiation cell as in any one of claims 1 or 2, wherein the distance of each of the irradiation conveyor lines from the source panel is individually adjustable.

6. The irradiation cell as in any one of claims 1 or 2, including means for conveying at a constant speed the loads being conveyed on the irradiation conveyor lines and/or the transfer conveyor lines.

7. The irradiation cell as in any one of claims 1 or 2, including means for conveying at a variable speed the loads conveyed on the irradiation conveyor lines and-/or the transfer conveyor lines.

8. The irradiation cell as in any one of claims 1 or 2, including means for operating the irradiation conveyor lines and/or transfer conveyor lines in two directions.

9. The irradiation cell as in any one of claims 1 or 2, wherein the conveyor lines comprise means for conveying product loaded on palettes.

10. The irradiation cell as in any one of claims 1 or 2, wherein the conveyor lines comprise means for conveying product parcels of varying dimension.

11. The irradiation cell as in any one of claims 1 or 2, wherein the conveyor lines comprise means for conveying similar product loads for simultaneous irradiation.

12. The irradiation cell as in any one of claims 1 or 2, wherein the conveyor lines comprise means for conveying different product loads for simultaneous irradiation.

13. The irradiation cell as in any one of claims 1 or 2, wherein the conveyor lines are microprocessor or computer controlled.

* * * * *